July 3, 1962

R. W. GILBERT 3,042,912

DECODING APPARATUS

Filed Jan. 30, 1959

ROSWELL W. GILBERT
INVENTOR.

BY
Rudolph J. Lurick
ATTORNEY

July 3, 1962

R. W. GILBERT 3,042,912

DECODING APPARATUS

Filed Jan. 30, 1959

ROSWELL W. GILBERT
INVENTOR.

BY
ATTORNEY

United States Patent Office 3,042,912
Patented July 3, 1962

3,042,912
DECODING APPARATUS
Roswell W. Gilbert, East Orange, N.J., assignor, by mesne assignments, to Daystrom, Incorporated, Murray Hill, N.J., a corporation of Texas
Filed Jan. 30, 1959, Ser. No. 790,227
5 Claims. (Cl. 340—347)

This invention relates to a decoding apparatus and more particularly to an alpha-numeric character indicator for visual display of letters, numeric digits, or other characters.

In the computing and automation fields, computers, and like digital devices, are often employed wherein the intelligence in the form of coded information, such as binary coded information, for example, is utilized. When the intelligence is to be interpreted, or utilized by humans, the information is often desired in other, more readily comprehensible forms, such as decimal number values, letters, or other symbols familiar to the human operator. The alpha-numeric indicator unit of my invention is a basic mechanism for the visual display of single letters, numeric digits, and other characters and symbols, and a plurality of such units are well suited to in-line mounting for full language display in response to digital address. Printers, capable of full language, are available in the form of machine typewriters, and provide a permanent visual presentation of the output from the computer or like digital device. However, no suitable complementary device for the equivalent transient visual presentation is currently available. Several forms of limited decimal indicators are currently in successful usage; mainly, projection units, edge-lighted plate systems, lamp matrixes and gas-filled numerical indicator tubes, such as "Nixie" tubes. Such prior art decimal indicators need only have a ten (10) character capacity (0 through 9), whereas a full language capacity requires the full alphabet and a blank position as well as decimal digits, or a minimum of thirty-seven (37) characters. These prior art digital indicator forms do not intrinsically offer methods practically extendible to this increased capacity.

An alternative prior art apparatus which is capable of high character capacity is the servo belt type, which is a serially-operated belt addressed through a coincidence switch. With this type of apparatus, however, the mechanical wear, when operated at a fast response speed, is prohibitive to continuous high-speed operation, and such a mechanical structure is difficult to ruggedize.

The character indicator of my invention is small, of simple design, and may be mounted in in-line groups up to the required capacity with, for example, hundreds of characters per group. The display is readable at a distance, and capable of a response time substantially shorter than the minimum visual read-out period. Further, the indicator includes a novel address mechanism suited to multidigit binary-coded computer information without translation.

An object of this invention is the provision of a new and novel decoding apparatus, which is of simple design, inexpensive, and easily manufactured.

An object of this invention is the provision of an apparatus for decoding information developed by a digital computer, or the like, which apparatus includes a code plate having light permeable areas thereon, an address mechanism connecting the computer output to the code plate for positioning the code plate in any one of a plurality of positional states, a plurality of light sources for transmission through discrete areas of the code plate, and a screen upon which the light passing through the code plate forms the desired characters.

An object of this invention is the provision of an alpha-numeric character indicator which is capable of visual display of a large number of characters, greatly exceeding the capacity of a straight alpha-numeric (36 character) apparatus.

An object of this invention is the provision of a novel multi-digit binary address arrangement comprising a plurality of interconnected differential beams actuated by equal-throw solenoids energized by a digital computer, or the like, for locating a code plate at any one of a plurality of positional states.

An object of this invention is the provision of a character indicator having a visual resolution substantially better than most prior art matrix type indicators.

These and other objects and advantages will become apparent from the following description when taken with the accompanying drawings. It will be understood that the drawings are for purposes of illustration, and are not to be construed as defining the scope or limits of the invention, reference being had for the latter purpose to the appended claims.

In the drawings wherein like reference characters denote like parts in the several views.

Figure 1:
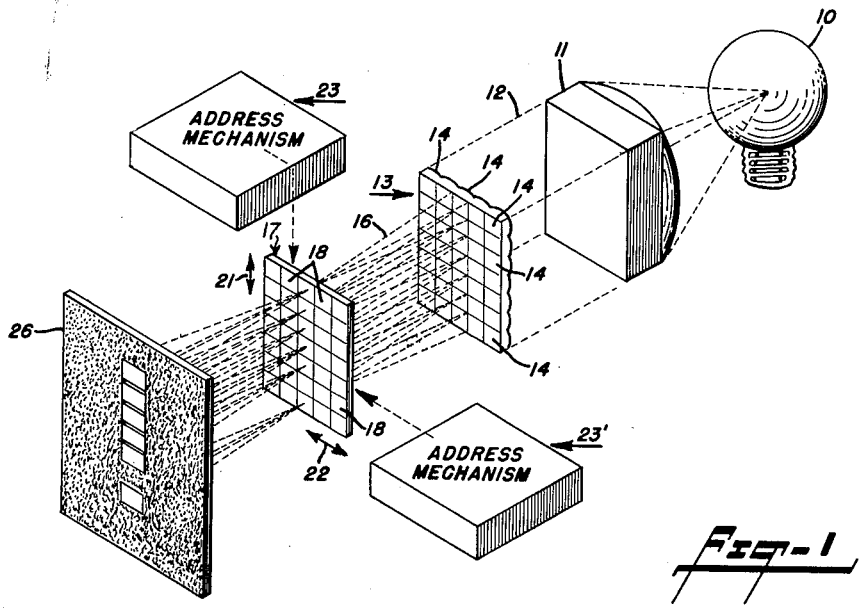
FIGURE 1 is a semi-diagrammatic perspective view of an indicator embodying my invention.

Reference is first made to FIGURE 1 of the drawings wherein there is shown a decoding apparatus embodying my invention, which apparatus includes a light source 10 energized by any suitable means not shown in the drawings. The illumination from the light source 10 is collimated by a collimating lens 11 (or lens system, if desired) whereby the illumination from the lens 11 is of a generally rectangular optical beam 12. It will here be understood that the apparatus is intended for operation with light energy falling within the visible light region of the spectrum as well as regions to either side thereof, such as, for example, ultra-violet and infra-red energy. The use of the term optical, or light, beam throughout the application (i.e., specification and claims) specifically includes such visible and invisible spectrum.

A compound lens plate 13, having a plurality of lens elements 14 formed thereon, is positioned in the path of the light collimation 12. The lens plate may be made of acrylic material, for example, and produced by a molding process; a suitable mold for the production of the lens plate being produced, for example, by machine grinding and finishing of the individual lens element surfaces by a rotating ball technique. Preferably, a rectangular-shaped lens plate is employed; in FIGURE 1, the illustrated lens plate is seven (7) lens elements in height and five (5) in width for a total of thirty-five (35) separate lens elements. The 5×7 configuration has been chosen for purposes of simplicity of illustration only, whereas in practice patterns of about 10×16, 20×34, lens elements, or more, are preferably employed.

It will be understood, then, that the collimated light beam 12 from the lens 11 is formed into a rectangular planar pattern of optical beams by the compound lens 14, and while a total of thirty-five (35) beams are produced by the thirty-five (35) lens elements 14 of the lens plate, for clarity of illustration, only several of the beams, designated 16, are shown eminating from the lens plate. While other means are available to provide a plurality of energy sources, such as a simple hole-screen plate, the compound lens technique offers an optical efficiency approaching unity whereas the simple hole-screen plate would have an almost prohibitively low efficiency for the required number of sources.

The individual light beams 16, from the compound lens 13, come to a prime focus at a character code plate, or matrix, 17 which includes a plurality of discrete light permeable and opaque areas. The matrix, or optical code, plate may comprise, for example, a transparency printed from a master plate, bearing the desired character code data, by precision microphotographic process. The character code plate, or matrix 17, for purposes of description, comprises a plurality of code elements 18, equal to the number of individual light beams 16 from the compound lens 13. Further, the code plate is bi-directionally movable in its plane, i.e., vertically and horizontally in the direction of the arrows 21 and 22, respectively, by means of suitable address mechanisms which may be of identical construction, but which are designated 23 and 23' for purposes of description. The address mechanisms are mechanically coupled to the character code plate through a coupling means illustrated by broken lines in FIGURE 1. The code plate is adapted to be moved by the address mechanisms in the mutually perpendicular directions a maximum distance equal to the respective height and width of an individual code element 18. Within such maximum travel, the code plate is movable into any one of a plurality of selectable positional states in each direction. By use of address mechanisms of the type illustrated in FIGURE 3, and described below, the matrix plate 17 is movable into any of eight selectable positions in each direction, or a total of 64 individual positions. Such address mechanism are binary compatible ($2^3$) and a full binary address will require only six (6) information bits.

Figure 2:
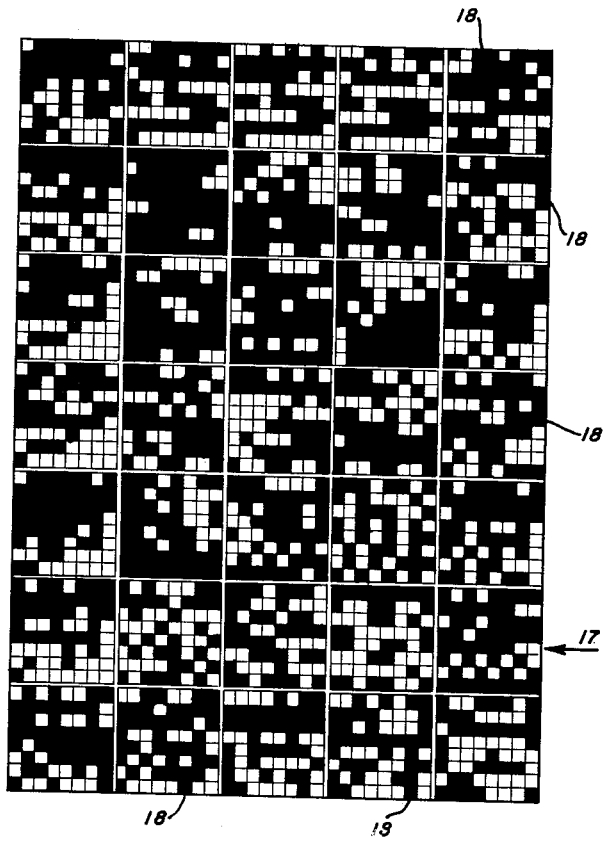
FIGURE 2 is a face view of a novel code plate employed in the indicator.

As mentioned above, the letters, numbers, and desired characters to be read out of the indicator are coded on the matrix plate 17. Reference is now made to FIGURE 2, wherein there is shown a face view of a typical matrix, or character code, plate. Each code element 18 is divided into 8×8, or 64, discrete areas which may be either light permeable, or opaque, depending upon the code selected, to provide a character capacity of 64 characters, which is greatly in excess of a straight alphanumeric capacity (36 bits) and is also greater than the capacity on a standard typewriter keyboard, for example, having 58 bits. For purposes of illustration, only, the code elements 18 on the optical code plate 17 are defined by closely spaced parallel lines, and the 64 discrete areas within the individual code elements are defined by single lines. Obviously, in the actual construction of the code plate, no such parallel or single lines are necessary and, ordinarily, would not be included in the plate construction.

The thirty-five (35) individual light beams 16 (of FIGURE 1) from the compound lens, focus at the code plate 17 within one of the 64 discrete areas of each code element 18. As shown in FIGURE 1, light transmitted through the transparent, or light permeable areas of the code plate 17, is projected upon a diffuse transmission screen plate 26. The screen plate comprises, ideally, a cosine law diffusing surface with a minimum of specular transmission, since it is desired to provide adequate light radiation at flat angles and to avoid hot-spot effects due to direct specular transmission. Techniques are available for producing such a diffusion surface on glass, plastic, and the like. In the illustration of FIGURE 1, the matrix plate code and the positioning of the code plate are such that an exclamation mark (!) is projected on the screen 26.

Figure 3:
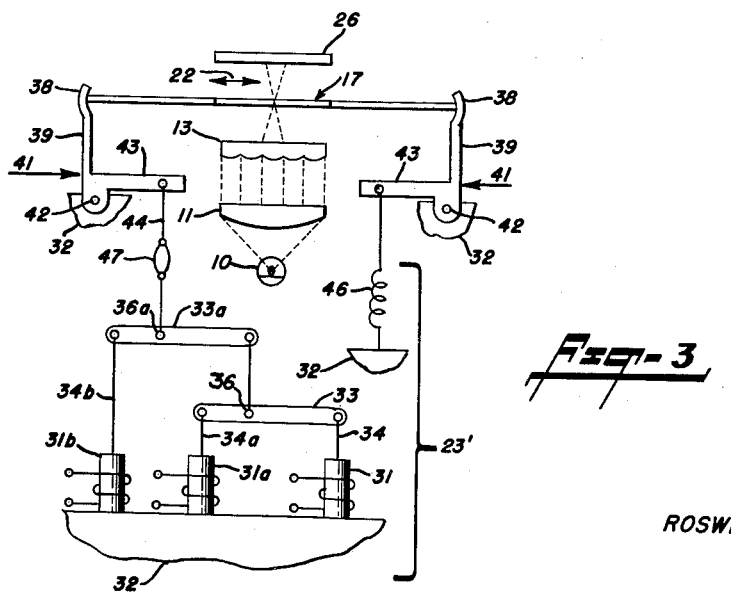
FIGURE 3 is a diagrammatic view of a novel binary address arrangement for use in the indicator.

Reference is now made to FIGURE 3 of the drawings wherein there is diagrammatically illustrated a novel binary address mechanism suitable for use with the novel indicator of my invention. The address mechanism 23' is shown attached to a code plate 17 for selectively positioning the code plate in a horizontal position in the direction of the arrows 22. A second address mechanism 23, of identical construction, but not shown in the diagram of FIGURE 3, is attached to the code plate for vertical actuation thereof. The address mechanism, illustrated in FIGURE 3, has eight (8) positions selectable by excitation of three solenoid actuators 31, 31a and 31b fixed to a suitable support 32. Included in the address mechanism is a binary linkage, comprising two differential beams 33 and 33a having ratios of 1:2 and which are connected by drag links 34, 34a, and 34b to the respective solenoid actuators 31, 31a and 31b. The fulcrum 36, of the differential beam 33, is not fixed but, instead, is moved upon actuation of either solenoid 31 or 31a. The "floating" fulcrum 36, of the beam 33, is connected to the long arm of the beam 33a, the fulcrum 36a of the beam 33a also being of the "floating" type and movable upon actuation of any of the three solenoids 31, 31a or 31b.

The character code plate, or matrix plate 17 is slidably mounted within curved channel members 38, 38 formed on the ends of arm members 39, 39, and comprising a portion of L-shaped levers 41, 41. The levers are pivotably mounted about pins 42, 42 secured to the support 32. One arm 43 of the lever 41 to the left, as viewed in FIGURE 3, is connected through a drag link 44 to the "floating" fulcrum 36a of the beam 33a, while the other arm 43 is connected through a return spring 46 to the support 32. A turnbuckle 47 is shown included in the link 44 for adjustment of the binary linkage, but could, obviously, be included in any of the other links for the same purpose. By placing the return spring 46 in the binary linkage at the end of the system opposite the actuators, the spring serves also to take up any play in the system and to compensate for wear thereof as well.

Each solenoid has a similar positive and fixed displacement upon actuation, but through the linkage 23' moves the matrix plate in binary proportion. Thus, it will be seen that energization of the solenoids 31, 31a and 31b will move the matrix plate one, two and four "units," respectively. Thus, the matrix plate can be moved into any one of the required eight (8) positions by binary address of the three solenoids.

As mentioned above, a similar mechanism operated by three other solenoid actuators operates the matrix plate in the other direction, and by binary address to all 6 solenoids, the plate may be moved into any one of 64 positions. Only six circuits (6 wires and a common) are required for full address to the indicator. Further, a parallel binary address appears preferable to any other code for general application because, in general, it is easier to translate other codes into binary, and serial address into parallel address than vice versa. Shift registers and/or scalers can satisfy any required translation.

It will further be noted that the solenoid actuators may be either monostable or bistable for continuous signal address or address by pulses, respectively. If desired, the bistable solenoids for pulse address can be equipped with auxiliary contacts for interrogation of position.

Having now described my invention in detail, in accordance with the patent statutes, various changes and modifications will suggest themselves to those skilled in this art. For example, the indicator may be designed for ready changeability of the character code plate so that a number of plates can be developed for modified or special purpose indications. In addition, it is possible to produce polychrome code plates for selection in colors. Commands, instructions, or the like, of varying nature, or urgency, could be color coded for immediate identification by the operator.

The illustrated indicator, employing a 5×7 code plate and compound lens, has a visual resolution comparable to present matrix type indicators. As mentioned above, however, the indicator is not limited to code plates and lens systems of this dimension, but is well suited to 10×16, 20×36, unit systems, for example, wherein the visual resolution would be substantially better.

An indicator with a 64-character capacity has been illustrated as a practical arrangement having a slightly greater capacity than the standard typewriter keyboard, but, obviously, the indicator is not limited to such capacity. Further, a binary compatible arrangement is not necessary, since the code plate may be actuated by any suitable address mechanism, not necessarily a binary mechanism. It is intended that the above such changes and modifications shall fall within the spirit and scope of the invention as recited in the following claims.

I claim:

1. A decoding apparatus and optical system comprising a single code plate having a plurality of patterns each formed of a plurality of transparent and opaque areas; means forming a plurality of focused light beams corresponding in number to the number of said patterns, each light beam having its focal point in the plane of the code plate; and means relatively positioning the code plate along two different axes lying in the plane of the code plate so that certain of the light beams will pass through selected transparent areas of selected patterns.

2. The invention as recited in claim 1, wherein the said axes are mutually perpendicular.

3. The invention as recited in claim 1, wherein the code plate is a photographic transparency.

4. The invention as recited in claim 1, including a screen member positioned to recive light beams passing through the code plate thereby forming on the screen member visible characters in correspondence with the particular position of the code plate.

5. An apparatus and optical system for decoding coded information comprising a source of collimated light; a single code plate having a plurality of patterns each formed of a plurality of transparent and opaque areas; a multiple lens device disposed in the path of the collimated light and including lens elements corresponding in number to the number of patterns on the code plate; said lens elements forming discrete, focused light beams which strike the code plate and have their focal points in the plane of the code plate; means positioning the code plate along two mutually perpendicular axes lying in the plane of the code plate so that certain of the light beams will pass through selected transparent areas of selected patterns; a screen member positioned to receive light beams passing through the code plate thereby forming on the screen member visible characters in correspondence with the particular position of the code plate.

References Cited in the file of this patent

UNITED STATES PATENTS

| | | |
|---|---|---|
| 1,938,899 | Gilman | Dec. 12, 1933 |
| 2,605,965 | Shepherd | Aug. 5, 1952 |
| 2,747,797 | Beaumont | May 29, 1956 |
| 2,756,930 | Pelsor et al. | July 31, 1956 |
| 2,807,799 | Rosenthal | Sept. 24, 1957 |